United States Patent

Porter et al.

(10) Patent No.: US 9,850,771 B2
(45) Date of Patent: Dec. 26, 2017

(54) GAS TURBINE ENGINE SEALING ARRANGEMENT

(71) Applicant: UNITED TECHNOLOGIES CORPORATION, Hartford, CT (US)

(72) Inventors: Steven D. Porter, Wethersfield, CT (US); John T. Ols, Northborough, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 314 days.

(21) Appl. No.: 14/603,414

(22) Filed: Jan. 23, 2015

(65) Prior Publication Data

US 2016/0177763 A1 Jun. 23, 2016

Related U.S. Application Data

(60) Provisional application No. 61/936,913, filed on Feb. 7, 2014.

(51) Int. Cl.
F01D 11/00 (2006.01)
F02C 7/28 (2006.01)
(Continued)

(52) U.S. Cl.
CPC ............ F01D 11/005 (2013.01); F01D 9/02 (2013.01); F01D 9/041 (2013.01); F01D 9/06 (2013.01); F01D 25/26 (2013.01); F02C 3/04 (2013.01); F02C 7/28 (2013.01); F05D 2220/32 (2013.01); F05D 2240/128 (2013.01); F05D 2240/58 (2013.01); F05D 2240/80 (2013.01)

(58) Field of Classification Search
CPC ........ F01D 11/005; F01D 25/26; F01D 25/14; F01D 25/243; F01D 11/003; F02C 7/28; F02C 7/20; F05D 2240/58; F05D 2240/581; F05D 2240/56; F05D 2240/55; F05D 2240/91
See application file for complete search history.

(56) References Cited

U.S. PATENT DOCUMENTS 4,190,397 A * 2/1980 Schilling ............... F01D 25/243
415/108
4,702,670 A 10/1987 Winter
(Continued)

FOREIGN PATENT DOCUMENTS

EP 2372099 A2 10/2011
GB 733537 * 7/1955 ........... F01D 24/145
WO WO2012163611 * 12/2012 ............ F01D 11/00

OTHER PUBLICATIONS

Extended European Search Report for Application No. EP 15 15 3210 dated Jun. 5, 2015.

Primary Examiner — Andrew Nguyen
(74) Attorney, Agent, or Firm — Carlson, Gaskey & Olds, P.C.

(57) ABSTRACT

A sealing arrangement for a gas turbine engine according to an exemplary aspect of the present disclosure includes, among other things, a groove that extends between an upstream rail and a downstream rail, a complementary static structure spaced from the groove, and a seal positioned within the groove and configured to seal a clearance between at least one of the upstream rail and the downstream rail and the complementary static structure.

14 Claims, 6 Drawing Sheets

(51) Int. Cl.
*F01D 9/02* (2006.01)
*F01D 9/04* (2006.01)
*F01D 9/06* (2006.01)
*F01D 25/26* (2006.01)
*F02C 3/04* (2006.01)

(56) References Cited

U.S. PATENT DOCUMENTS

| | | | |
|---|---|---|---|
| 4,767,260 A | 8/1988 | Clevenger et al. | |
| 5,211,536 A | 5/1993 | Ackerman et al. | |
| 5,218,816 A | 6/1993 | Plemmons et al. | |
| 5,372,476 A | 12/1994 | Hemmelgarn et al. | |
| 6,161,839 A | 12/2000 | Walton et al. | |
| 6,916,154 B2 | 7/2005 | Synnott | |
| 7,121,793 B2 | 10/2006 | Correia | |
| 7,922,444 B2 | 4/2011 | Propheter-Hinckley | |
| 2004/0154303 A1* | 8/2004 | Mitchell | F01D 11/005 60/772 |
| 2004/0219014 A1 | 11/2004 | Synnott | |
| 2005/0061005 A1* | 3/2005 | Lepretre | F01D 11/005 60/800 |
| 2005/0135928 A1 | 6/2005 | Servadio et al. | |
| 2006/0055118 A1 | 3/2006 | Beichl | |
| 2009/0169376 A1 | 7/2009 | Morgan et al. | |
| 2010/0111682 A1* | 5/2010 | Scoggins | F01D 9/041 415/191 |
| 2010/0132369 A1 | 6/2010 | Durocher et al. | |
| 2010/0132371 A1 | 6/2010 | Durocher et al. | |
| 2011/0079019 A1 | 4/2011 | Durocher et al. | |
| 2011/0081234 A1 | 4/2011 | Durocher et al. | |
| 2011/0081237 A1* | 4/2011 | Durocher | F01D 9/06 415/173.1 |
| 2011/0214433 A1 | 9/2011 | Feindel et al. | |
| 2011/0233876 A1* | 9/2011 | Bergman | F01D 11/005 277/628 |
| 2013/0224011 A1* | 8/2013 | Hashimoto | F02C 7/28 415/211.2 |
| 2013/0323045 A1 | 12/2013 | Porter et al. | |
| 2013/0323046 A1 | 12/2013 | Gordon et al. | |
| 2014/0161607 A1* | 6/2014 | Pirker | F01D 9/065 415/208.1 |

\* cited by examiner

GAS TURBINE ENGINE SEALING ARRANGEMENT

CROSS-REFERENCE TO RELATED APPLICATION

This application claims priority to U.S. Provisional Application No. 61/936,913, which was filed on Feb. 7, 2014.

BACKGROUND

This disclosure relates to a gas turbine engine, and more particularly to a sealing arrangement for sealing static structures of a gas turbine engine.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines are commonly assembled from numerous coaxial housings and components that must be sealed relative to one another to address pressure differentials and thermal loading. For example, static structures, such as turbine frames, ducts, vane assemblies, nozzle assemblies or the like, may need to be sealed relative to surrounding cavities that extend between the static structures and other complementary static structures.

SUMMARY

A sealing arrangement for a gas turbine engine according to an exemplary aspect of the present disclosure includes, among other things, a groove that extends between an upstream rail and a downstream rail, a complementary static structure spaced from the groove, and a seal positioned within the groove and configured to seal a clearance between at least one of the upstream rail and the downstream rail and the complementary static structure.

In a further non-limiting embodiment of the foregoing sealing arrangement, the groove and the seal are arranged at an aft, inner diameter portion of a static structure.

In a further non-limiting embodiment of either of the foregoing sealing arrangements, the static structure is a vane assembly or a turbine frame.

In a further non-limiting embodiment of any of the foregoing sealing arrangements, the groove is formed in a non-gas path surface of a platform.

In a further non-limiting embodiment of any of the foregoing sealing arrangements, the seal is a piston seal.

In a further non-limiting embodiment of any of the foregoing sealing arrangements, the piston seal applies an inward springing force against the complementary static structure.

In a further non-limiting embodiment of any of the foregoing sealing arrangements, the complementary static structure is positioned radially inward of the upstream rail and the downstream rail.

In a further non-limiting embodiment of any of the foregoing sealing arrangements, at least one of the upstream rail and the downstream rail includes at least one relief slot.

In a further non-limiting embodiment of any of the foregoing sealing arrangements, the upstream rail extends to a first distance from an engine centerline longitudinal axis and the downstream rail extends to a second, different distance from the engine centerline longitudinal axis.

In a further non-limiting embodiment of any of the foregoing sealing arrangements, a first clearance extends between the upstream rail and the complementary static structure and a second, larger clearance extends between the downstream rail and the complementary static structure.

In a further non-limiting embodiment of any of the foregoing sealing arrangements, a radial clearance extends between the seal and a bottom of the groove, and the radial clearance is greater than the first clearance.

In a further non-limiting embodiment of any of the foregoing sealing arrangements, at least one of the upstream rail and the downstream rail is tapered.

A static structure for a gas turbine engine according to another exemplary aspect of the present disclosure includes, among other things, an airfoil that extends between an inner platform and an outer platform and a sealing arrangement that includes a groove formed in at least one of the inner platform and the outer platform. A seal is received within the groove. The groove extends between an upstream rail and a downstream rail.

In a further non-limiting embodiment of the foregoing static structure, the static structure is a turbine frame, a duct, a vane assembly, a nozzle assembly, or a full hoop ring assembly.

In a further non-limiting embodiment of either of the foregoing static structures, the groove is formed in a non-gas path surface of the inner platform.

In a further non-limiting embodiment of any of the foregoing static structures, the seal extends between the groove and a complementary static structure radially inward of the seal.

In a further non-limiting embodiment of any of the foregoing static structures, the seal is positioned at an aft, inner diameter portion of the static structure.

In a further non-limiting embodiment of any of the foregoing static structures, the seal is a piston seal that applies an inward springing force against a complementary static structure spaced from the inner platform or the outer platform.

In a further non-limiting embodiment of any of the foregoing static structures, at least one of the upstream rail and the downstream rail includes at least one relief slot.

A gas turbine engine according to another exemplary aspect of the present disclosure includes a compressor section, a combustor section in fluid communication with the compressor section, a turbine section in fluid communication with the combustor section, and a static structure associated with at least one of the compressor section, the combustor section and the turbine section. The static structure includes an airfoil that extends between an outer platform and an inner platform and a sealing arrangement that is part of at least one of the outer platform and the inner platform. The sealing arrangement includes a groove that extends between an upstream rail and a downstream rail and a seal received within the groove.

The embodiments, examples and alternatives of the preceding paragraphs, the claims, or the following descriptions and drawings including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to a sealing arrangement for sealing about a static structure of a gas turbine engine. The sealing arrangement may include a groove that extends between an upstream rail and a downstream rail. A complementary static structure is radially spaced from the groove. A seal may be positioned within the groove and configured to seal a clearance between the groove and the complementary static structure. These and other features are described in additional detail herein.

Figure 1:
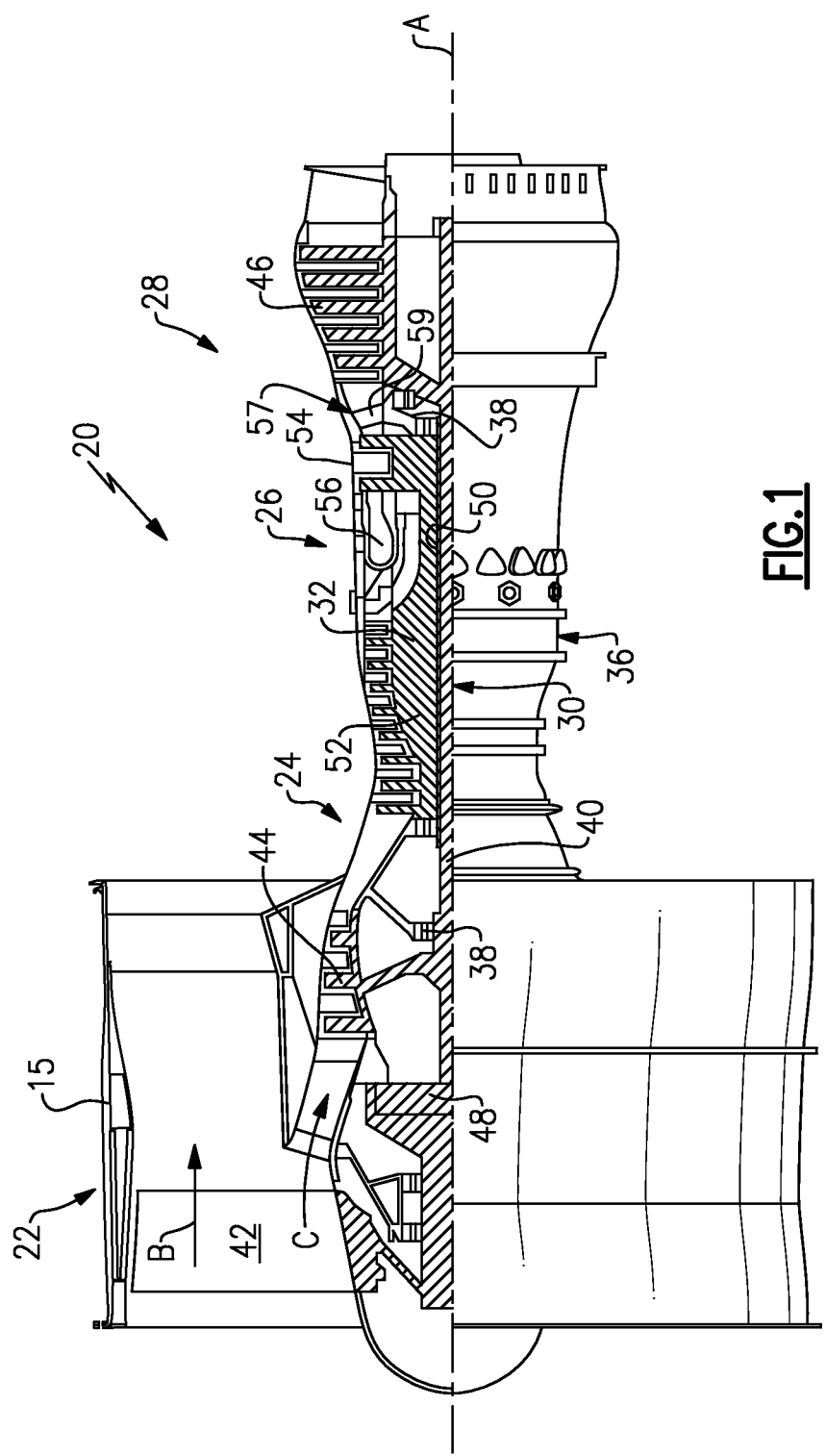
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of the bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via the bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1,150 ft/second (350.5 meters/second).

Figure 2:
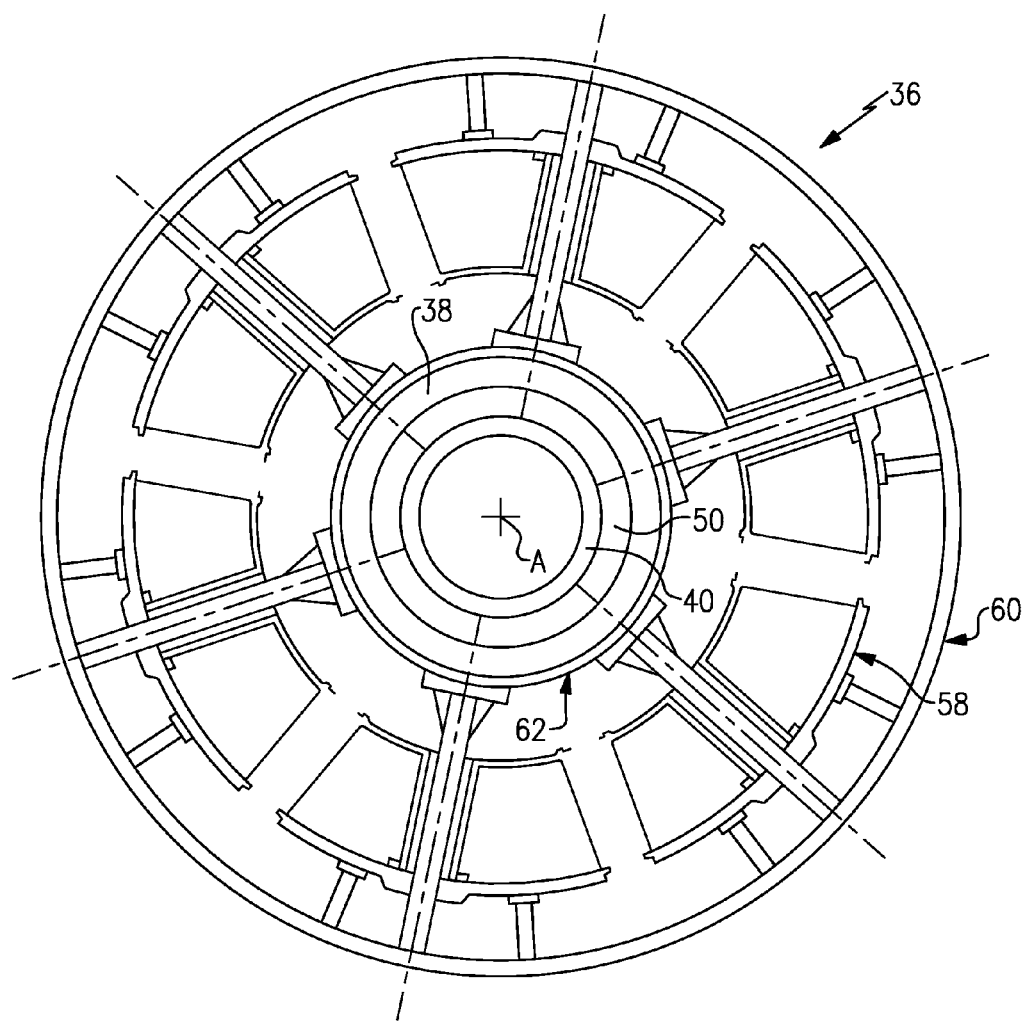
FIG. 2 illustrates a cross-section of a static structure of a gas turbine engine.

FIG. 2 illustrates a static structure 58 that can be incorporated into a gas turbine engine, such as the gas turbine engine 20 of FIG. 1. In this example, the static structure 58 is a turbine frame that can be positioned between the high pressure turbine 54 and the low pressure turbine 46 (see, for example, feature 57 of FIG. 1) or between any other sections of the turbine section. However, the teachings of this disclosure are not limited to a turbine frame and could extend to other static structures, including but not limited to, ducts, vane assemblies, nozzle assemblies, or full hoop ring assemblies.

The static structure 58 can be mounted to extend between an outer casing 60 and an inner casing 62 of the engine static structure 36. For example, in one non-limiting embodiment, the outer casing 60 and the inner casing 62 are part of a turbine exhaust case of the engine static structure 36. The inner casing 62 can support a bearing system 38 as well as other components within which the inner and outer shafts 40, 50 rotate.

The static structure 58 can be mechanically attached relative to the outer casing 60 and the inner casing 62 or can be thermally free relative to these structures. It should be understood that various attachment arrangements may alternatively or additionally be utilized within the scope of this disclosure.

Figure 3:
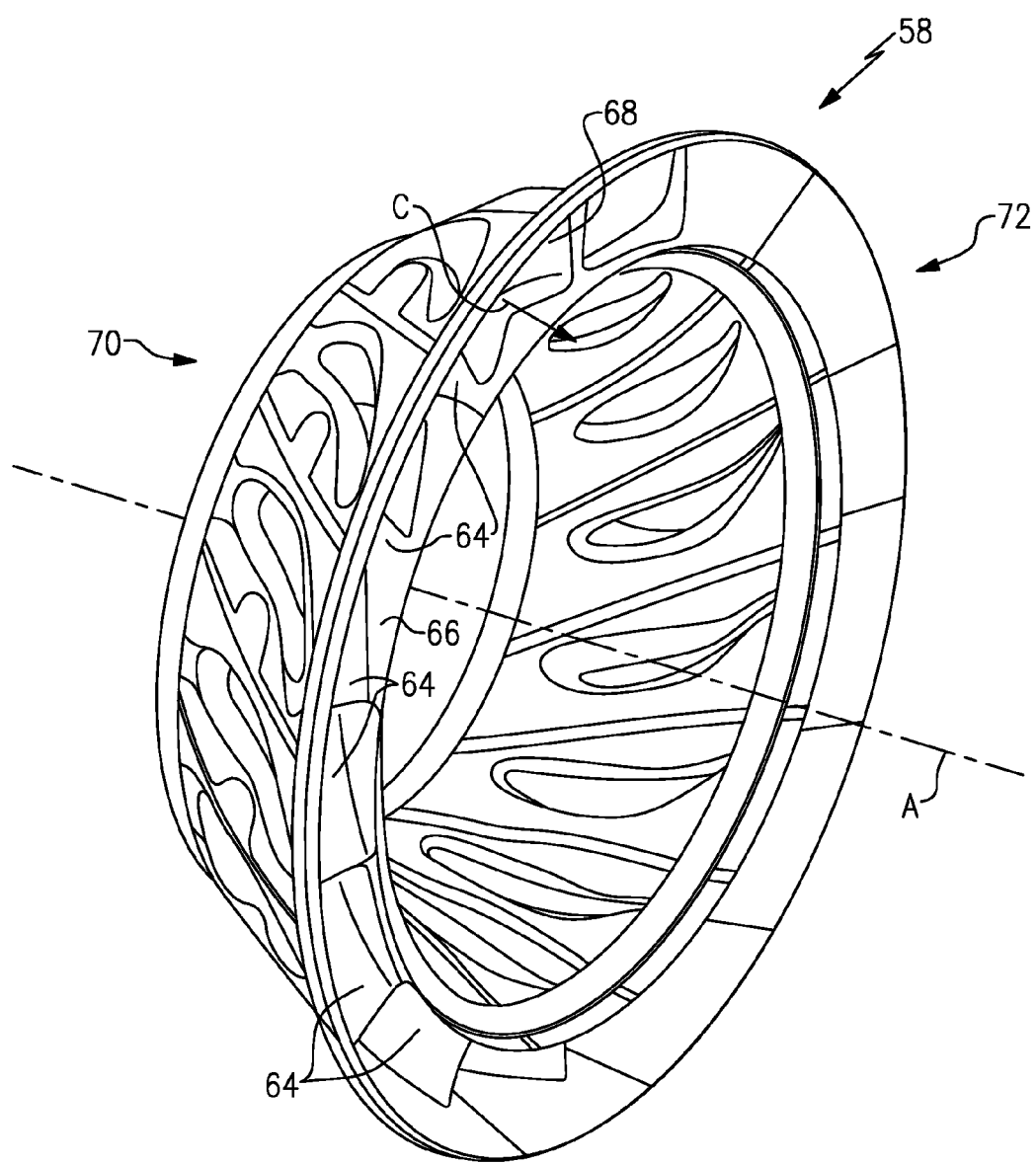
FIG. 3 illustrates a perspective view of a static structure.

Referring to FIG. 3, the exemplary static structure 58 can include a multitude of airfoils 64 that radially extend between an inner platform 66 and an outer platform 68 of the static structure 58. The multitude of airfoils 64 are axially disposed between a leading edge 70 and a trailing edge 72 of the static structure 58.

The multitude of airfoils 64 can be assembled to form an annular ring assembly that circumferentially extends about the engine central longitudinal axis A to define a portion of the annular core flow path C radially between the inner platform 66 and the outer platform 68 and across the multitude of airfoils 64. In other words, the inner platform 66 and the outer platform 68 establish the inner and outer flow boundaries of the core flow path C within the static structure 58.

The static structure 58 can include various sealing arrangements for sealing the static structure 58 relative to the inner casing 62 and the outer casing 60 (see FIG. 2) or other surrounding complementary static structures. Exemplary embodiments of such sealing arrangements are discussed in greater detail below.

Figure 4:
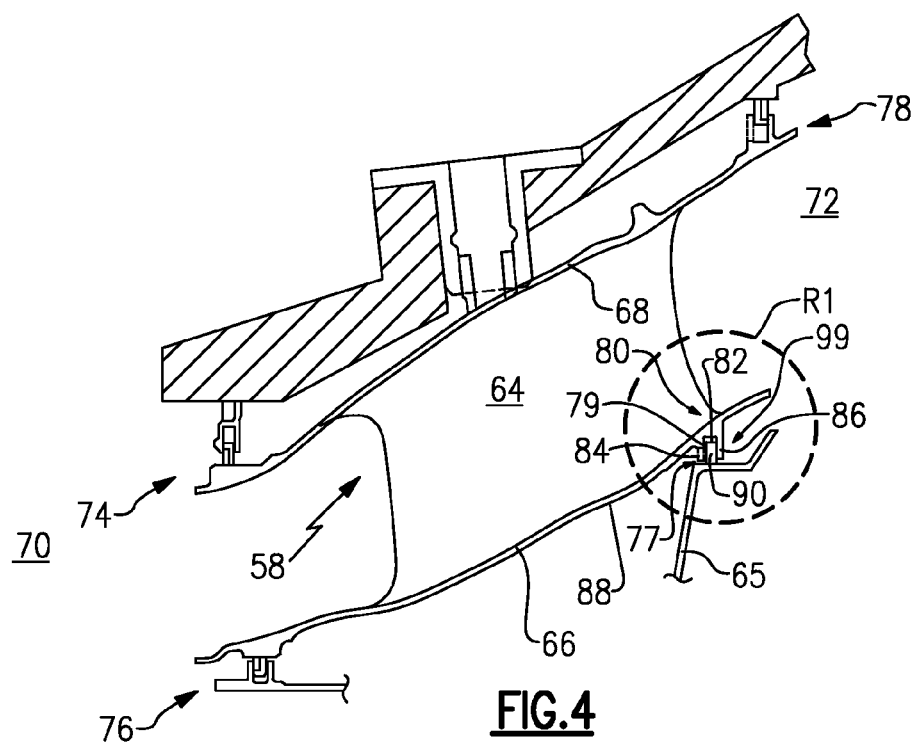
FIG. 4 illustrates an exemplary sealing arrangement for sealing a static structure.

FIG. 4 illustrates a cross-sectional view of a portion of a static structure 58. In one exemplary embodiment, the static structure 58 may require sealing arrangements at an upstream, outer diameter portion 74, an upstream, inner diameter portion 76, an aft, outer diameter portion 78 and/or an aft, inner diameter portion 80.

In one non-limiting embodiment, a sealing arrangement 99 is disposed adjacent the trailing edge 72 of the static structure 58 at the inner platform 66 of the multitude of airfoils 64 (only one shown in FIG. 4). In other words, in this embodiment, the sealing arrangement 99 is arranged to seal the static structure 58 at its aft, inner diameter portion 80. Although the various features of the sealing arrangement 99 are described herein with respect to the aft, inner diameter portion 80 of the static structure 58, it should be understood that similar sealing arrangements could be arranged to seal one or more portions of the static structure 58, including but not limited to, the upstream, outer diameter portion 74, the upstream, inner diameter portion 76, and/or the aft, outer diameter portion 78.

The static structure 58 may be manufactured from a cast nickel alloy. However, various other materials may alternatively be utilized and may be specifically selected to match a coefficient of thermal expansion between the different sections and parts of the static structure 58.

In one non-limiting embodiment, the sealing arrangement 99 radially extends between the inner platform 66 of the static structure 58 and a complementary static structure 65. The complementary static structure 65 could be the inner casing 62 of the engine static structure 36 (see FIG. 2 or 3) or some other structure.

The inner platform 66 may include a groove 82 that extends between an upstream rail 84 and a downstream rail 86. In one non-limiting embodiment, the upstream rail 84 and the downstream rail 86 extend radially inwardly from a non-gas path surface 88 of the inner platform 66. In other words, the upstream rail 84 and the downstream rail 86 extend in a radial direction toward the complementary static structure 65.

A seal 90 may be received at least partially within the groove 82. The seal 90 extends radially between the inner platform 66 and the complementary static structure 65 (i.e., across a clearance 77 between these parts) to seal the aft, inner-diameter portion 80 of the static structure 58. A gap 79 may extend between the upstream rail 84 and the seal 90.

Figure 5:
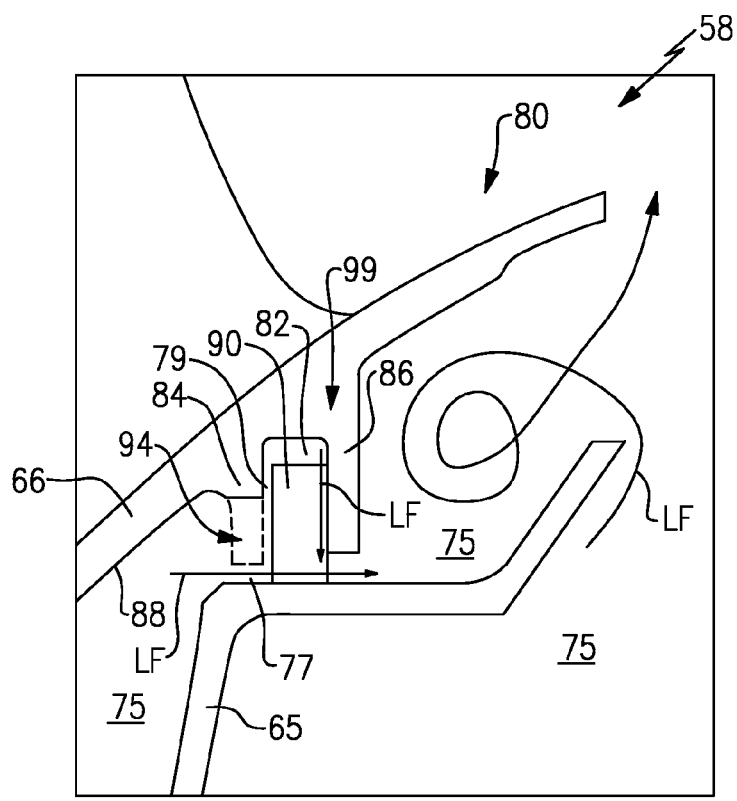
FIG. 5 illustrates a blown-up view of region R1 of FIG. 4.

Referring now to FIGS. 4 and 5, the sealing arrangement 99 is configured to address a thermal fight that may occur between the aft, outer diameter portion 78 and the aft, inner diameter portion 80. For example, a thermal mismatch may exist between the aft, outer diameter portion 78 and the aft, inner diameter portion 80 because of relatively cool leakage flow LF that escapes from surrounding cavities 75 and cools the aft, inner diameter portion 80 of the static structure 58, thereby driving stress into the part (see FIG. 5). The cavities 75 surround the static structure 58 and the complementary static structure 65 and are positioned radially inward from the static structure 58 in this embodiment. The sealing arrangement 99 reduces the impact that the leakage flow LF has on the static structure 58 to increase the life of the static structure.

Figure 6:
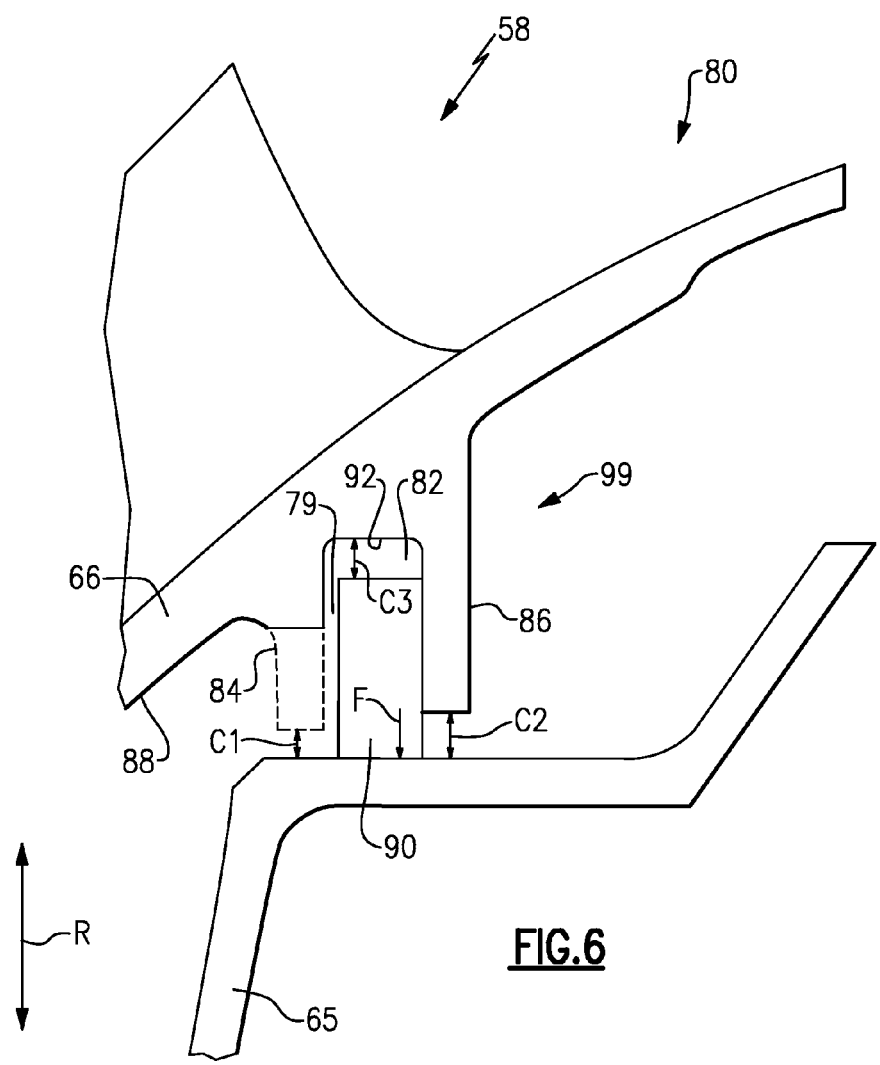
FIG. 6 illustrates an enlarged, cross-sectional view of a sealing arrangement.

FIG. 6 illustrates an enlarged view of the aft, inner diameter portion 80 of the static structure 58. As described above, the seal 90 extends in the radial direction R between the inner platform 66 and the complementary static structure 65. In one non-limiting embodiment, the seal 90 is a piston seal. In another embodiment, the seal 90 is a piston seal that applies an inward springing force F against the complementary static structure 65. Other seals may additionally be suitable for use within the sealing arrangement 99.

In one non-limiting embodiment, the upstream rail 84 extends a first radial distance from the non-gas path surface 88 of the inner platform 66 and the downstream rail 86 extends a second, different radial distance R2 from the non-gas path surface 88. In this way, a first clearance C1 extends between the upstream rail 84 and the complementary static structure 65 and a second, larger clearance C2 extends between the downstream rail 86 and the complementary static structure 65. The clearances C1, C2 reduce stresses associated with the static structure 58. The upstream rail 84 also protects the seal 90 against bottoming out between the complementary static structure 65 and the static structure 58, which could cause damage to the seal 90. The clearances C1, C2 are also small enough to prevent the seal 90 from becoming disengaged from the groove 82 during certain operating conditions.

A radial clearance C3 extends between the seal 90 and a bottom 92 of the groove 82. The radial clearance C3 may be larger than the first clearance C1 so that the seal 90 cannot be crushed during assembly procedures. In another embodiment, the size of the radial clearance C3 is between the sizes of the first clearance C1 and the second clearance C2.

Figure 7:
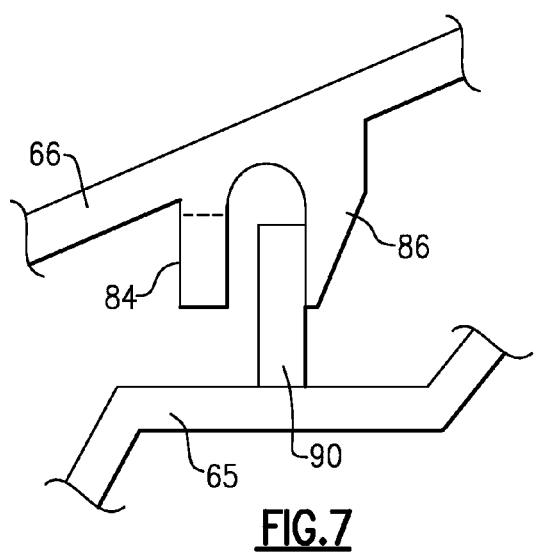
FIG. 7 illustrates a tapered rail of a sealing arrangement.

In one embodiment, the upstream rail 84 and the downstream rail 86 are parallel to one another. In another embodiment, one or both of the upstream rail 84 and the downstream rail 86 is tapered in a direction from the inner platform 66 toward the complementary static structure 65 (see FIG. 7, illustrating a tapered downstream rail 86).

Figure 8A:
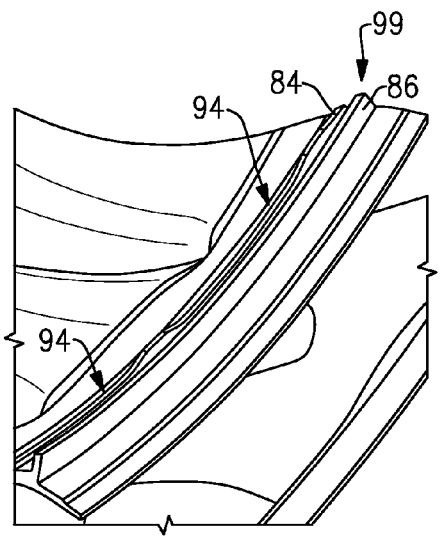
FIGS. 8A, 8B and 8C illustrate additional features of a gas turbine engine sealing arrangement.
Figure 8B:
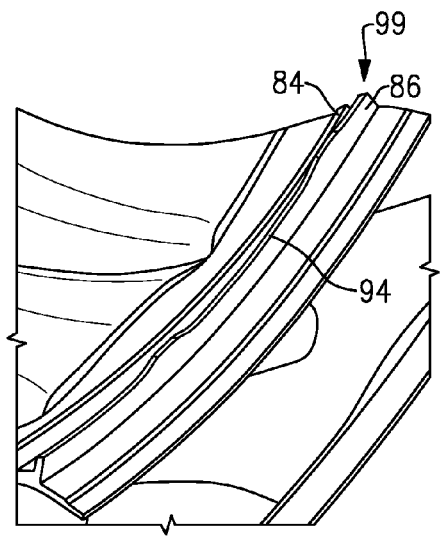
Figure 8C:
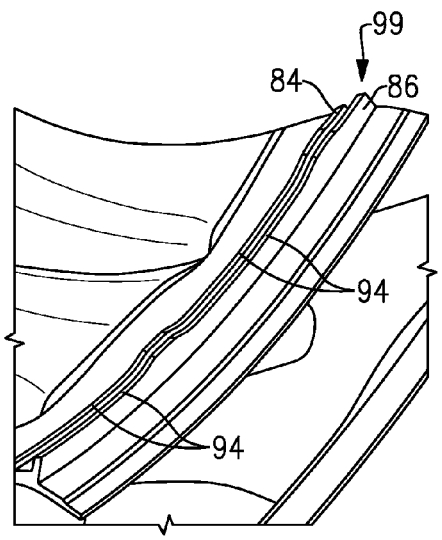

FIGS. 8A, 8B and 8C illustrate additional features that may be incorporated into the exemplary sealing arrangement 99 detailed above. Referring first to FIG. 8A, the upstream rail 84 may be scalloped to minimize hoop stresses in the upstream rail 84. In other words, the upstream rail 84 may include a plurality of relief slots 94 (i.e., cut out portions of the upstream rail 84), whereas the downstream rail 86 excludes such slots in this embodiment. The relief slots 94 extend radially into the upstream rail 84 (i.e., toward the outer platform 68, see FIGS. 4 and 5) and may be positioned at relatively high stress areas of the upstream rail 84.

In an alternative embodiment, shown in FIG. 8B, the relief slots 94 are formed in the downstream rail 86 to reduce hoop stresses. In yet another embodiment, shown in FIG. 8C, both the upstream rail 84 and the downstream rail 86 include relief slots 94. The relief slots 94 of the upstream rail 84 do not necessarily need to align with the relief slots 94 of the downstream rail 86 although depicted as that way in FIG. 8C. Moreover, the relief slots 94 of the upstream rail 84 could include depths that are equal to or different than the depths of the relief slots 94 of the downstream rail 86.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A static frame for a gas turbine engine, comprising:
   an annular platform, the platform having a first platform surface that faces radially toward a core flow path and includes a plurality of airfoils extending therefrom, and a second platform surface that faces radially away from the core flow path;
   a static structure disposed radially adjacent to the second platform surface, the static structure including a third platform surface that radially faces the second platform surface, wherein said static structure is a mid-turbine frame arranged between a low pressure turbine and a high pressure turbine; and
   a fluid seal between the second platform surface and the third platform surface, the fluid seal comprising:
   a first annular rail extending radially from the second platform surface toward the third platform surface by a first distance;
   a second annular rail that is downstream of the first annular rail, the second annular rail extending radially from the second platform surface towards the third platform surface by a second distance that is less than the first distance;
   an annular groove on the second platform surface defined between the first annular rail and the second annular rail so that the annular groove is J-shaped; and
   an annular seal extending from third platform surface into the annular groove to form a sealing relationship between the annular seal and the second annular rail, wherein said groove and said seal are arranged at an aft, inner diameter portion of the static frame.

2. The static frame as recited in claim 1, wherein said seal is a piston seal.

3. The static frame as recited in claim 2, wherein said piston seal applies an inward springing force against said static structure.

4. The static frame as recited in claim 1, wherein at least one of said first annular rail and said second annular rail includes at least one relief slot.

5. The static frame as recited in claim 1, wherein a first clearance extends between said first annular rail and said static structure and a second, larger clearance extends between said second annular rail and said static structure.

6. The static frame as recited in claim 1, wherein at least one of said first annular rail and said second annular rail is tapered.

7. A static structure for a gas turbine engine, comprising:
   an airfoil that extends between an inner platform and an outer platform;
   a sealing arrangement that includes a groove formed in at least one of said inner platform and said outer platform and a seal received within said groove, wherein said groove extends between an upstream rail and a downstream rail, and wherein said upstream rail extends to a first distance from an engine centerline longitudinal axis and said downstream rail extends to a second, different distance from said engine centerline longitudinal axis; and
   wherein said static structure is a mid-turbine frame arranged between a low pressure turbine and a high pressure turbine, wherein said seal is positioned at an aft, inner diameter portion of said static structure.

8. The static structure as recited in claim 7, wherein said groove is formed in a non-gas path surface of said inner platform.

9. The static structure as recited in claim 7, wherein said seal extends between said groove and an inner casing radially inward of said seal.

10. The static structure as recited in claim 7, wherein said seal is a piston seal that applies an inward springing force against an inner casing spaced from said inner platform or said outer platform.

11. The static structure as recited in claim 7, wherein at least one of said upstream rail and said downstream rail includes at least one relief slot.

12. A gas turbine engine, comprising:
   a compressor section;
   a combustor section in fluid communication with said compressor section;
   a turbine section in fluid communication with said combustor section;
   a static structure associated with at least one of said compressor section, said combustor section and said turbine section, wherein said static structure includes an airfoil that extends between an outer platform and an inner platform;

a sealing arrangement that is part of at least one of said outer platform and said inner platform, said sealing arrangement including a groove that extends between an upstream rail and a downstream rail and a seal received within said groove, and wherein said upstream rail extends to a first distance from an engine centerline longitudinal axis and said downstream rail extends to a second, different distance from said engine centerline longitudinal axis; and wherein said turbine section includes a low pressure turbine and a high pressure turbine, said static structure being a mid-turbine frame arranged between said low and high pressure turbines, wherein said seal is positioned at an aft, inner diameter portion of said static structure.

13. The static structure as recited in claim 8, wherein each of said upstream rail and said downstream rail includes at least one relief slot.

14. The gas turbine engine as recited in claim 12, wherein each of said upstream rail and said downstream rail includes a plurality of relief slots.

* * * * *

UNITED STATES PATENT AND TRADEMARK OFFICE
CERTIFICATE OF CORRECTION

PATENT NO. : 9,850,771 B2
APPLICATION NO. : 14/603414
DATED : December 26, 2017
INVENTOR(S) : Steven D. Porter and John T. Ols It is certified that error appears in the above-identified patent and that said Letters Patent is hereby corrected as shown below:

In the Claims

In Claim 1, Column 8, Line 12; replace "the seal" with --the annular seal--

In Claim 2, Column 8, Line 14; replace "the seal" with --the annular seal--

Signed and Sealed this
Thirteenth Day of June, 2023

Katherine Kelly Vidal
*Director of the United States Patent and Trademark Office*